US010706441B2

(12) United States Patent
Cavanaugh et al.

(10) Patent No.: US 10,706,441 B2
(45) Date of Patent: *Jul. 7, 2020

(54) PRODUCT AND SERVICE PURCHASE-CYCLE TRACKING

(71) Applicant: AT&T Intellectual Property I, L.P., Atlanta, GA (US)

(72) Inventors: Craig M. Cavanaugh, Atlanta, GA (US); John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/668,770

(22) Filed: Aug. 4, 2017

(65) Prior Publication Data

US 2017/0330223 A1   Nov. 16, 2017

Related U.S. Application Data

(63) Continuation of application No. 15/241,248, filed on Aug. 19, 2016, now Pat. No. 9,754,281, which is a
(Continued)

(51) Int. Cl.
*H04W 4/14* (2009.01)
*G06Q 30/02* (2012.01)
(Continued)

(52) U.S. Cl.
CPC ......... *G06Q 30/0246* (2013.01); *G06Q 10/06* (2013.01); *G06Q 20/322* (2013.01);
(Continued)

(58) Field of Classification Search
None
See application file for complete search history.

(56) References Cited

U.S. PATENT DOCUMENTS 5,903,635 A    5/1999  Kaplan
6,470,079 B1  10/2002  Benson
(Continued)

OTHER PUBLICATIONS

U.S. Office Action dated Oct. 14, 2010 in U.S. Appl. No. 11/744,620.
(Continued)

*Primary Examiner* — Thomas L Mansfield
(74) *Attorney, Agent, or Firm* — Hartman & Citrin LLC

(57) ABSTRACT

Systems and methods for using wireless communication devices to track the effects of advertising are described herein. In some embodiments, a method includes representing the identity of an advertising impression, that is, a specific advertisement, with an impression code. According to exemplary embodiments, the advertising impression is directed to at least one commodity, such as one or more products and services. The method may also further include receiving the impression into a computer-readable memory of a wireless communication device. The method further includes detecting the wireless communication device, and then providing the impression code during the purchase of the commodity. The method continues with obtaining the identity of the advertising impression from the impression code. The method additionally includes creating a transaction record, wherein the transaction record includes the advertising impression identity and an identity of the commodity, and storing the transaction record in a database.

20 Claims, 8 Drawing Sheets

Related U.S. Application Data continuation of application No. 11/744,620, filed on May 4, 2007, now Pat. No. 9,449,290.

(51) Int. Cl.
*G06Q 10/06* (2012.01)
*H04W 76/14* (2018.01)
*G06Q 20/32* (2012.01)
*H04L 29/08* (2006.01)

(52) U.S. Cl.
CPC ......... *G06Q 30/02* (2013.01); *G06Q 30/0238* (2013.01); *G06Q 30/0242* (2013.01); *G06Q 30/0267* (2013.01); *G06Q 30/0277* (2013.01); *H04L 67/02* (2013.01); *H04W 4/14* (2013.01); *H04W 76/14* (2018.02)

(56) References Cited

U.S. PATENT DOCUMENTS

| | | | |
|---|---|---|---|
| 6,772,129 B2 | 8/2004 | Alvarez et al. | |
| 6,820,062 B1* | 11/2004 | Gupta | B62B 3/1408 705/16 |
| 6,892,181 B1 | 5/2005 | Megiddo et al. | |
| 7,010,497 B1 | 3/2006 | Nyhan et al. | |
| 7,194,425 B2 | 3/2007 | Nyhan et al. | |
| 7,299,194 B1 | 11/2007 | Manganaris et al. | |
| 7,567,918 B2 | 7/2009 | Manganaris et al. | |
| 7,574,374 B2 | 8/2009 | Nyhan et al. | |
| 7,660,747 B2* | 2/2010 | Brice | B62B 3/1424 705/14.63 |
| 7,895,076 B2* | 2/2011 | Kutaragi | A63F 13/77 705/14.4 |
| 8,574,074 B2* | 11/2013 | van Datta | G06Q 30/02 463/33 |
| 9,449,290 B1 | 9/2016 | Cavanaugh | |
| 2002/0167916 A1* | 11/2002 | Clapper | A47F 10/02 370/312 |
| 2002/0174025 A1* | 11/2002 | Hind | G06Q 30/02 705/26.1 |
| 2003/0132298 A1* | 7/2003 | Swartz | G06K 17/00 235/472.02 |
| 2006/0015409 A1 | 1/2006 | Kato et al. | |
| 2006/0247978 A1* | 11/2006 | Davis | G06Q 30/02 705/26.1 |
| 2007/0038511 A1* | 2/2007 | Hytken | G06Q 30/02 705/14.27 |
| 2007/0064920 A1 | 3/2007 | Ruckart | |
| 2007/0123219 A1* | 5/2007 | Lovell, Jr. | G06Q 20/3255 455/412.1 |
| 2007/0168884 A1* | 7/2007 | Weeks | H04H 20/93 715/847 |
| 2007/0226055 A1 | 9/2007 | Belanger et al. | |
| 2007/0226056 A1 | 9/2007 | Belanger et al. | |
| 2007/0265912 A1 | 11/2007 | Belanger et al. | |
| 2008/0043950 A1 | 2/2008 | Myers et al. | |
| 2008/0059297 A1* | 3/2008 | Vallier | G06Q 30/02 705/14.27 |
| 2008/0102947 A1* | 5/2008 | Hays | A63F 13/12 463/31 |
| 2008/0139181 A1 | 6/2008 | Lokshin | |
| 2008/0182590 A1 | 7/2008 | Ruckart et al. | |
| 2008/0201214 A1 | 8/2008 | Aaron et al. | |
| 2008/0208731 A1 | 8/2008 | Ruckart | |
| 2008/0243626 A1* | 10/2008 | Stawar | B62B 3/1424 705/23 |
| 2008/0281668 A1 | 11/2008 | Nurminen | |
| 2009/0046704 A1 | 2/2009 | Sternam | |
| 2012/0004970 A1 | 1/2012 | Satyavolu | |
| 2012/0095856 A1* | 4/2012 | Sanjeev | G06Q 20/204 705/17 |

OTHER PUBLICATIONS

U.S. Office Action dated May 10, 2011 in U.S. Appl. No. 11/744,620.
U.S. Office Action dated Feb. 13, 2014 in U.S. Appl. No. 11/744,620.
U.S. Office Action dated Aug. 22, 2014 in U.S. Appl. No. 11/744,620.
U.S. Office Action dated Mar. 4, 2015 in U.S. Appl. No. 11/744,620.
U.S. Office Action dated Nov. 12, 2015 in U.S. Appl. No. 11/744,620.
U.S. Notice of Allowance dated May 23, 2006 in U.S. Appl. No. 11/744,620.
U.S. Office Action dated Sep. 27, 2016 in U.S. Appl. No. 15/241,248.
U.S. Notice of Allowance dated May 8, 2017 in U.S. Appl. No. 15/241,248.

* cited by examiner

PRODUCT AND SERVICE PURCHASE-CYCLE TRACKING

This application is a continuation of and claims priority to U.S. patent application Ser. No. 15/241,248, filed Aug. 19, 2016, now U.S. Pat. No. 9,754,281, which is a continuation of and claims priority to U.S. patent application Ser. No. 11/744,620, filed May 4, 2007, now U.S. Pat. No. 9,449,290.

FIELD OF THE DISCLOSURE

Background

Advertisers and marketers are generally not perfectly effective in targeting consumers. In some cases, advertisers and marketers may waste as much as half of their advertising budget during the process of reaching their customers. Some of this waste may be caused by the lack of ability to track customer information. Thus, advertisers and marketers may place a great deal of value on tracking consumer information such as customer demographics data, customer response to advertising campaigns, efficiency of sales channels, and the like. This data may enable advertisers and marketers to eliminate some of the waste and improve their ability to reach consumers.

Currently, some advertisers and marketers have attempted to gain insight into consumer purchasing habits by tracking consumer purchases with consumer cards. For example, grocery and retail stores may issue "membership cards" that provide discounts. Each of these consumer cards, which may be conveniently carried by a consumer, is typically provided with a unique consumer identification number. When presented at points of sale, these consumer cards may enable retailers to associate consumers with specific purchases. Further, they may enable retailers to recognize consumer purchasing habits and trends. Such information may be further passed on to advertisers and marketers, who may use the information to direct their advertising budgets and techniques. Similarly, some advertisers and marketers may obtain consumer purchasing habits from credit card providers, who may easily amass data on credit card users and their purchasing habits.

Consumer cards and credit card transactions may not provide all the information needed by advertisers and marketers, however, as they only track actual purchases, which may not necessarily reflect responses to advertising. In addition, the information obtained may be fragmented when a consumer uses different membership cards or different credit cards for purchase transactions. In contrast, advertisers and marketers typically would like to be able to track consumer purchase cycles from first impression to the point of sale. This complete perspective may enable advertisers and marketers to better ascertain consumer habits and trends and direct their marketing practices. Therefore, it would be advantageous to provide a system that does not unduly burden consumers, yet offers a way to track consumer purchase cycles from first impression to the point of sale in exchange for incentives.

SUMMARY

Systems and methods for using wireless communication devices to track the effects of advertising are described herein. In different aspects, a method may include representing the identity of an advertising impression, that is, a specific advertisement, with an impression code. Generally, the advertising impression is directed to at least one commodity, such as one or more products and services. The method may also further include receiving the impression into a computer-readable memory of a wireless communication device. The method further includes detecting the wireless communication device, and then providing the impression code during the purchase of the commodity. The method then continues with obtaining the identity of the advertising impression from the impression code. The method additionally includes creating a transaction record including the advertising impression identity and an identity of the commodity, and storing the transaction record in a database.

A wireless communication device is also described herein. In some embodiments, the device includes a receiver that is employed to receive one or more impression codes. The impression code is associated with an advertising impression for a commodity. The device further comprises a computer-readable memory that is capable of storing the impression code. Moreover, the device also comprises a transmitter that is capable of transmitting the impression code.

Moreover, a purchase cycle tracking device is further described herein. In various embodiments, the device includes a receiver that is capable of receiving an impression code during the purchase of one or more commodities. The device also includes an analyzer that is employed to obtain the identity of the advertising impression from each of the impression codes. The device further comprises a recorder configured to create a transaction record for the impression code. Each transaction record includes the advertising impression identity and an identity of the commodity. The device also includes a computer-readable database configured to store the transaction records.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTIONS OF THE DRAWINGS

The teachings herein are described with reference to the accompanying figures.

DETAILED DESCRIPTION

It is to be understood that the figures and descriptions of the present invention have been simplified to illustrate elements that are relevant for a clear understanding of the present invention, while eliminating, for purposes of clarity, other elements.

Figure 1:
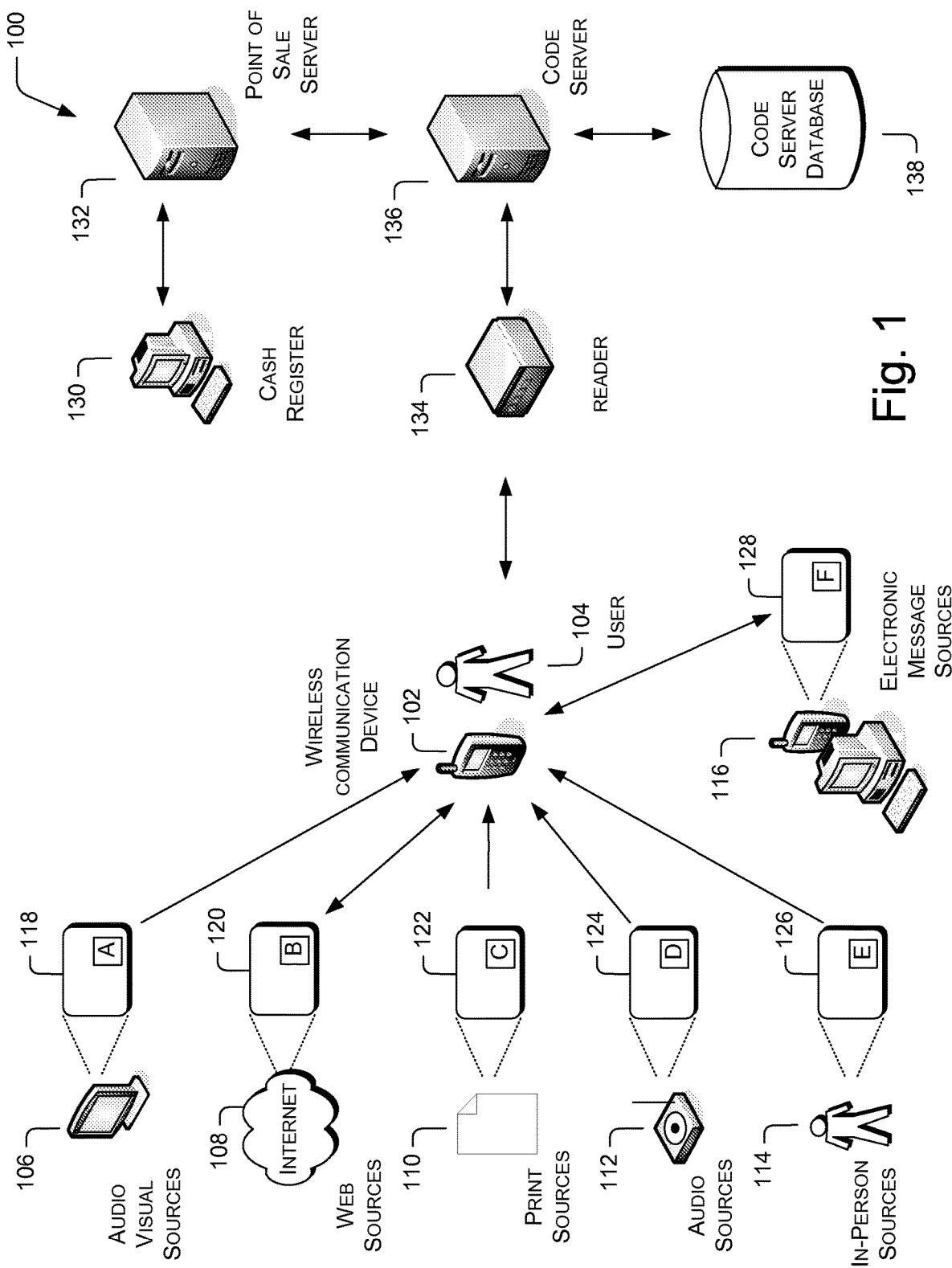
FIG. 1 is a block diagram illustrating various embodiments of an environment 100 in which purchase cycle tracking may be implemented.

FIG. 1 is a block diagram 100 illustrating various embodiments of an environment 100 in which purchase cycle tracking may be implemented. According to various embodiments, the environment 100 may include a wireless communication device 102, which may be operated by a user 104. FIG. 1 also illustrates an audio/visual advertising impression source 106, a World Wide Web (Web) advertising impression source 108, a print advertising impression source 110, an audio advertising impression source 112, an in-personal advertising impression source 114, and an electronic message advertising impression source 116. Specifically, the audio/visual impression source 106 may include television commercials, infomercials, product placement in movies, and the like.

Additionally, the environment 100 may include a cash register 130, which may be connected to and in bi-directional communication with a point of sale server 132. The environment 100 also includes a reader 134 that may be connected to and in bi-directional communication with a code server 136. The code server 136, in turn, may be connected to and in bi-directional communication with a code server database 138. The code server 136 may also be bi-directionally linked to the point of sale server 132.

The cash register 130 may be used to process purchase transactions. For example, the cash register 130 may be equipped with a barcode reader configured to read Universal Product Code (UPC) codes present on some merchandise, or receive manually entered purchase transactions. The cash register 130 may communicate with point of sale server 132 so that the UPC codes and the manually processed transactions are correlated with commodities and prices.

The reader 134 may be configured to wirelessly retrieve one or more impression codes, such as impression codes "A-F," associated with advertising impressions 118-128, respectively, from the wireless communication device 102. Impression codes are described in further detail below. In some embodiments, the reader 134 is configured to automatically detect the presence of one or more impression codes in a wireless communication device, such as wireless communication device 102, when the wireless communication device is determined to be in the vicinity of the reader 134.

For example, the reader 134 may sense the presence of wireless communication devices in the vicinity, such as wireless communication device 102, by continuously monitoring the environment for radio signals emitted by the wireless communication devices. Typically, wireless communication devices may emit such radio signals if they are in "standby mode." These signals may include auto-registration signals, update signals, and the like. Moreover, the reader 134 may be configured to detect all major wireless telecommunication signals, including analog and digital signals. These telecommunication signals may include signals that conform to standards such as Global System for Mobile Communication (GSM), Code Division Multiple Access (CDMA), Time Division Multiple Access (TDMA), Personal Communications Service (PCS), Personal Communications Network (PCN), and equivalent telecommunication signals of any frequency.

Once the wireless communication device is detected, the reader 134 may further retrieve impression codes A-F. In other embodiments, the reader 134 may be configured to only detect and retrieve impression codes when the reader 134 is activated by the code server 136.

In additional embodiments, the reader 134 may be configured to retrieve impression codes, such as impression codes "A-F" of impression sources 118-128, respectively, from the wireless communication device 102 via a variety of wireless technologies. In some embodiments, the reader 134 may include a wireless RF transceiver, an infrared transceiver, and/or a magnetic reader and retrieve impression codes via wireless technologies such as, but not limited to, cellular, PCS, WiFi, Ultrawideband, and/or Bluetooth. In other embodiments, the reader 134 may be configured with a user interface that enables the user 104 to manually input the impression code. Specifically, the user interface may include, but is not limited to, combinations of one or more of keypads, keyboards, mouse devices, touch screens, microphones, speech recognition packages, and other suitable devices or other electronic/software selection methods.

The code server 136 may be configured to coordinate the detection and retrieval of the impression codes from wireless communication device 102 by the reader 134. For example, in some embodiments, the code server 136 may only activate the reader 134 to detect and retrieve impression codes when the cash register 130 is processing a transaction. In particular embodiments, the code server 136 may obtain transaction information from the point of sale server 132, and use the information to facilitate the retrieval of impression codes from the wireless communication device 102. Moreover, the code server 136 may be employed to transmit the retrieved impression codes to the code server database 138, as well as analyze stored impression codes. It will be appreciated that in additional embodiments, the cash register 130 and the point of sale server 132 may be substituted with other payment processing equipment, so long as the payment processing equipment may inform the code server 136 of purchase transactions.

With continued reference to FIG. 1, the Web advertising impression source 108 may include click-thru ads, banner ads, pop-up ads, Web page embedded advertising, Web-cast multimedia commercials, Web-cast audio commercials, promotional web sites, promotional emails, and the like. The print advertising impression source 110 may include billboards, newspaper and magazine ads and inserts, product brochures and information sheets, store front signs, coupon books, and the like.

The audio advertising impression source 112 may include broadcast radio commercials, public address audio commercials (e.g., store announcements), telecommunication calls with retailers, vendors or manufacturers, and the like. In-person advertising impression source 114 may include person-to-person marketing statements by sales staff, word-of-mouth referrals from other consumers, and the like. Finally, electronic message advertising impression source 116 may include advertising impressions transmitted by email, text messages, short message service (SMS) texts, and the like. It will be appreciated that the above described forms of advertising impression sources are examples rather than limitations. Accordingly, other embodiments of the environment 100 may include additional advertising impression sources, so long as these sources are capable of conveying advertising impressions.

Moreover, as illustrated in FIG. 1, each of the sources 106-116 may respectively provide one or more advertising impressions, such as the advertising impressions 118-128. For example, audio visual source 106 may provide a television commercial, i.e., advertising impression 118, for a particular product or service. Likewise, Web source 108 may be a web page that that provides an advertising impression 120, e.g., pop-up advertisement, for a particular product or service, and so on and so forth. Furthermore, it will be appreciated that each of the advertising impressions 118-128 may also be for a plurality of related products or services. For example, the print source 110 may provide a magazine advertisement, i.e., advertising impression 122, which markets all the vehicle models from a particular car manufacturer.

In accordance with some embodiments, each of the advertising impressions 118-128 from the impression sources 106-116 may contain a unique impression code, such as one of the impression codes "A-F" that relates to the respective advertising impression. Specifically, the unique impression codes "A-F" may include an alphanumeric string of numbers and/or letters, a binary code, an SMS code, a generated bar code, and an optically-readable pictogram, (e.g., Semacode®, QR code). In further embodiments, the impression codes "A-F" may be a combination of strings, codes, and pictographs described above. Advertising impressions, such as the advertising impressions 118-128, may also contain other forms of the impression codes "A-F," so long as the forms are capable of uniquely identifying an individual advertising impression from other advertising impressions. The identity of the corresponding advertising impressions 118-128 may also be coded into the impression codes "A-F."

In additional embodiments, the impression codes "A-F" may also identify the commodity described by the advertising impressions 118-128. For example, the impression code "A" for a BellSouth advertising impression, such as the advertising impression 118, may identify the impression, e.g., television commercial no. 001, as well as the product, e.g., a BellSouth telephone, using a unique descriptor or identifier, e.g., an internal BellSouth item number, or a commercial UPC number for the BellSouth telephone.

As further illustrated in FIG. 1, the audio visual advertising impression 118 from the audio visual source 106 may contain an impression code that is represented by "A." Likewise, each of the other exemplary advertising impressions 120-128 may contain a unique impression code that is respectively represented by one of "B-F." In some embodiments, the unique impression code may be visually displayed to the user 104, such as in case of an alphanumeric impression code "C" that is contained in the print source advertising impression 122. In other embodiments, the unique impression code may be aurally announced to the user 104, such as in case of the audio source advertising impression 124 (e.g., impression code "D") or the in-person source advertising impression 126 (e.g., impression code "E"). It will be appreciated that "A-F" are used in FIG. 1 to represent actual impression codes, which may be in the forms described above. In some embodiments, the user 104 may enter the respective unique impression codes into the wireless communication device 102.

In other embodiments, the unique impression codes may also be directly provided to the wireless communication device 102 via electronic or optical transmission. For instance, impression code "F" may be provided via an advertising impression 128 from an electronic message source 116, or an optically-readable print source advertising impression 122 from a print source 110.

Specifically, in some examples, a pictogram impression code (e.g., Semacode®), or impression code "C," may be captured by the wireless communication device 102 if the device is equipped with a camera. In other examples, the electronic message source 116 may include radio frequency identification (RFID) tags. In other words, impression codes, such as impression codes "F," may be embedded in the RFID tags. Moreover, in such embodiments, the wireless communication device 102 may be configure read and receive impression codes "F" from the RFID tags.

Moreover, once the impression codes "A-F" are captured, they may be stored by the wireless communication device 102 into SMS, generated barcode, text files, or other data formats. Accordingly, in some embodiments, the wireless communication device 102 may have the ability to convert the impression codes "A-F" into other formats.

Figure 2:
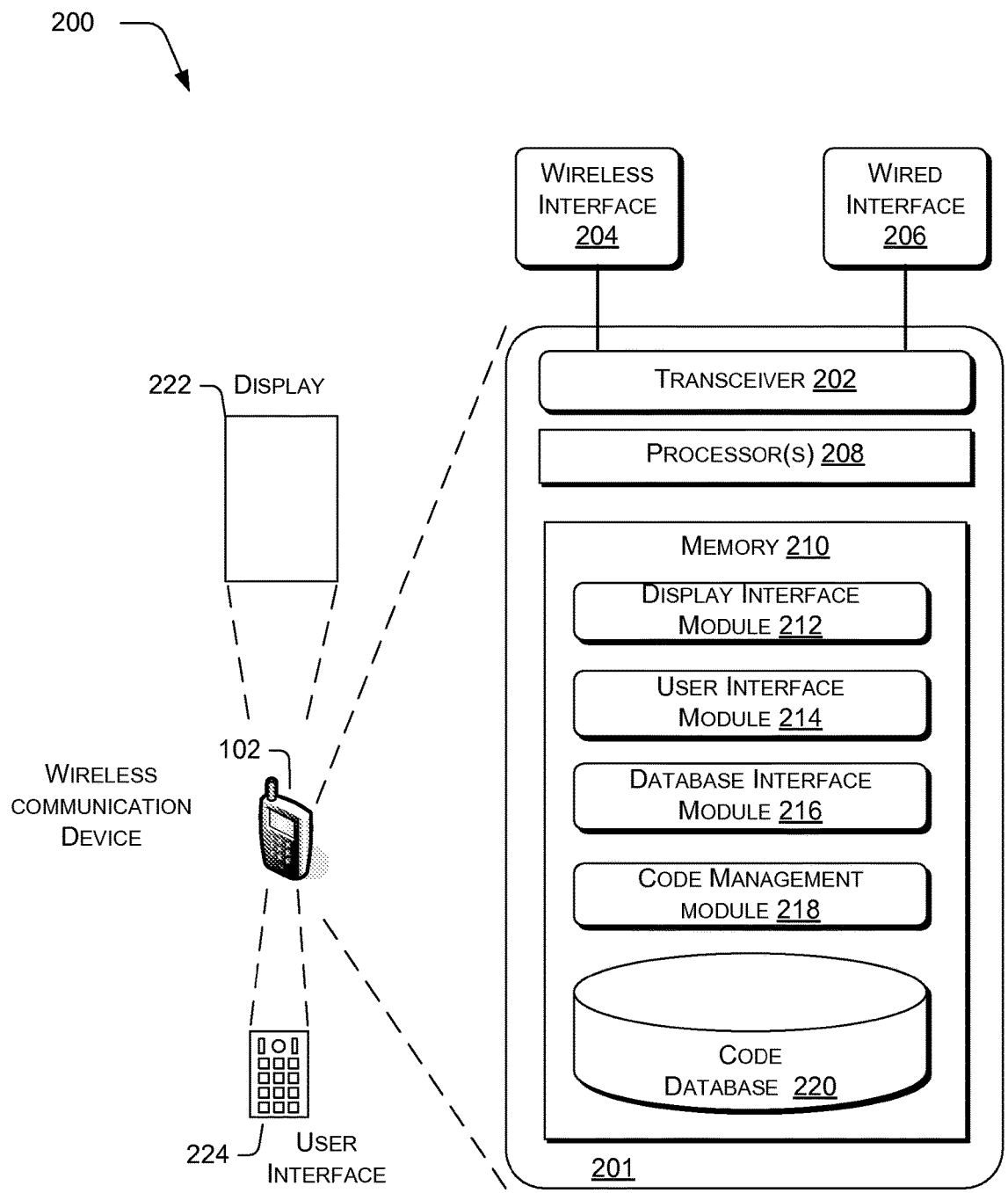
FIG. 2 is a block diagram illustrating selected components of a wireless communication device 102 shown in FIG. 1.

FIG. 2 is a block diagram 200 illustrating selected components of an exemplary wireless communication device 102 shown in FIG. 1. According to various embodiments, the wireless communication device 102 is a wireless telephone. According to other embodiments, the wireless communication device 102 is a personal digital assistant (PDA), smart phone, or any other suitable communication device.

As illustrated in FIG. 2, according to various embodiments, the wireless communication device 102 includes a housing 201 and internal components including a transceiver 202. A wireless interface 204 and a wired interface 206 are coupled to the transceiver 202. In some embodiments, the wireless interface 204 may include, but is not limited to, a wireless RF interface (e.g. cellular, PCS, WiFi, Ultrawideband, Bluetooth, satellite transmissions, RFID, etc.), an infrared interface, and the like. In further embodiments, the wired interface 206 may include a direct I/O interface, such as an SCSI interface, a serial interface, a USB interface, and the like. The transceiver 202, in conjunction with interfaces 204 and 206, may enable the wireless communication device 102 to connect with the Internet, communicate with other computing devices, as well as receive Web pages, instant text messages, SMS messages, "computer cookies," or other small data files.

Moreover, the wireless communication device 102 has processing capabilities and memory suitable to store and execute computer-executable instructions. In some embodiments, the wireless communication device 102 includes one or more processors 208 and memory 210. The memory 210 may include volatile and nonvolatile memory, removable and non-removable media implemented in any method or technology for storage of information, such as computer-readable instructions, data structures, program modules or other data. Such memory may include, but is not limited to, RAM, ROM, EEPROM, flash memory or other memory technology suitable for implementation in a portable device.

A display interface module 212, a user interface module 214, a database interface module 216, a code management module 218, and a code database 220 may be stored in memory 210 of the wireless communication device 102. In some embodiments, the display interface module 212 may be used to drive a display 222 that presents visual data to the user 104 (FIG. 1). The user interface module 214 may be used to receive inputs and outputs from a user interface 224. In various embodiments, the user interface 224 may include, but is not limited to, combinations of one or more of keypads, keyboards, mouse devices, touch screens, microphones, speech recognition packages, and any other suitable devices or other electronic/software selection methods.

In additional embodiments, the display interface module 212 may include a micro-browser (e.g., Opera® Mini) that enables the user 104 to view advertising impressions, such as advertising impression 120, from Web sources 108. The user 104 may then use the user interface 224 to select one or more impression codes, such as code "B" contained in the advertising impression 120. In certain embodiments, the code management module 218 may have a software interface that interacts with the micro-browser. Accordingly, once the user 104 has selected the one or more impression codes, the code management module 218 may retrieve the impression codes and use the database interface module 216 to store them into the code database 220.

In further embodiments, in addition to storing the impression codes into the code database 220, the code management module 218 may also reformat the impression codes, as described above. In other embodiments, the code management module 218 may create data records based on the impression codes for storage in the code database 220. By example rather than limitation, a data record may include customer identification, the identity of the products relevant to a particular impression code (as supplied by the impression code described above), originating device of the data record, current date and time of creation, that is, the date and time the impression code is received by the wireless communication device 102, etc. However, it will be appreciated that other information that is helpful to marketers or advertisers may also be collected and included in the data records. In some embodiments, as described below in FIG. 3, the code management module 218 may be configured to work in concert with a code detection module 314 residing on the code server 136.

The wireless communication device 102 may be connected with a desktop or portable computing device for the purpose of downloading impression codes. For example, the user 104 may have obtained impression codes, such as impression code "B," from Web Sources 108 by browsing web sites on the Internet using a home personal computer (PC), and may desire to transfer the impression codes to the wireless communication device 102. In such embodiments, the wireless communication device 100 may be electrically linked to the PC via the transceiver 202 and one of the wireless interface 204 (e.g., Bluetooth) and wired interface 206 (e.g., USB). The PC may be installed with a software application that communicates with the code management module 218. The software application may also enable the user 104 to save impression codes onto the PC for eventual transfer. Thus, the code management module 218 may download the impression codes via the established link. Once downloaded, the code management module 218 may store the impression codes in the code database 220, as described above.

In other embodiments, the wireless communication device 102 may receive impression codes, such as impression code "F," from electronic message advertising impressions 128. In these embodiments, the wireless communication device 102 may receive the electronic messages that include emails, text messages, and SMS text messages via the transceiver 202, the wireless interface 204, and the wired interface 206. The code management module 218 may then be employed to parse out the impression codes and store them into the code database 220 via database interface module 216. In some embodiments, the impression codes may be converted or placed in data records as described above.

According to some embodiments, the user interface module 214 enables a user 104 to enter impression codes observed from sources, such as the sources 106 and 110-114. For example, the user 104 watching a television commercial broadcast may observe an advertising impression, such as the advertising impression 118, which includes a particular impression code, such as the impression code "A." The particular impression code "A" may be an alphanumeric string. The user 104 may then employ the user interface 224 to enter the alphanumeric string into the wireless communication device 102. Once entered, the alphanumeric string is passed by the user interface module 214 to the code management module 218, which may then store the impression code into the code database 220. In particular embodiments, the impression codes may be converted or placed in data records as described above.

According to further embodiments, the wireless communication device 102 may be configured to receive impression codes, such as code "B" and code "F," respectively, from Web sources 108 and electronic message sources 128 only when a user has supplied information to the respective sources. For example, a particular advertiser may elect to only provide impression codes through its web site to the user 104, when he or she is willing to supply his or her name and telephone number. In another example, an advertiser may email an advertising impression that contains an impression code only if the user 104 supplies an email address to the advertiser. In other embodiments, an advertiser may request other personal information that includes name, address, phone numbers, employment data, and the like. It will be appreciated that marketers and advertisers may also solicit other information from users (e.g., hobbies, interests, income), so long as users are willing to provide such information. In specific embodiments, an advertiser may provide a user who supplies personal information with a unique impression code so that one or more purchases of the specific user 104, which correspond to the impression code, may be tracked at a later time.

When the user 104 provides personal information, the wireless communication device 102 may establish a link to an advertising impression source, such as Web source 108, via transceiver 202 and one of wireless interface 204 and wired interface 206. The display interface module 212 may be configured to display the information request from the advertising impression source on display 222. Once the wireless communication device 102 receives the requested information via user interface 224 and user interface module 214, the code management module 218 may submit the requested information via the established link. In turn, the code management module 218 may receive one or more impression codes, which are then stored in the code database 220 via database interface module 216. In some embodiments, the impression codes may be converted or placed in data records as describe above.

In additional embodiments, the user 104 may use a micro-browser included in the display interface module 212 to purchase merchandise via web-based transactions. In some of these embodiments, the code management module 218 may be configured so that the user 104 may use the micro-browser to trigger the code management module 218 during the purchase transaction. Once triggered, the code management module 218 may inform the code server 136 of the purchases during the purchase transactions.

In other embodiments, the code management module 218 may be configured to automatically prompt the user 104 to allow it to inform code server 136 of the purchases when the user is making a purchase using the micro-browser. For example, the code management module 218 may prompt the user 104 when the micro-browser is used to request a secured webpage, such as a webpage that is secured using Secure Socket Layer (SSL) mechanism, the Transport Layer Security (TLS) mechanism, and the like.

With continued reference to FIG. 2, while the code database 220 may be stored in memory 210 of the wireless communication device 102, it will be appreciated that code database 220 may also be located remotely from wireless communication device 102. For example, code database 220 may be located on a remote server, such as the code server 136. In such embodiments, the database interface module 216 may employ wireless interface 204 or wired interface 206 to access, that is, read and write data to code database 220.

Finally, according to various embodiments, the impression codes, such as codes "A-F," may be configured by marketers and advertisers to represent and provide incentive, such as discounts or upgrades on commodities, to induce users to eventually submit the impression codes. In this way, marketers and advertisers may ensure that the maximum number of impression codes is received.

Figure 3:
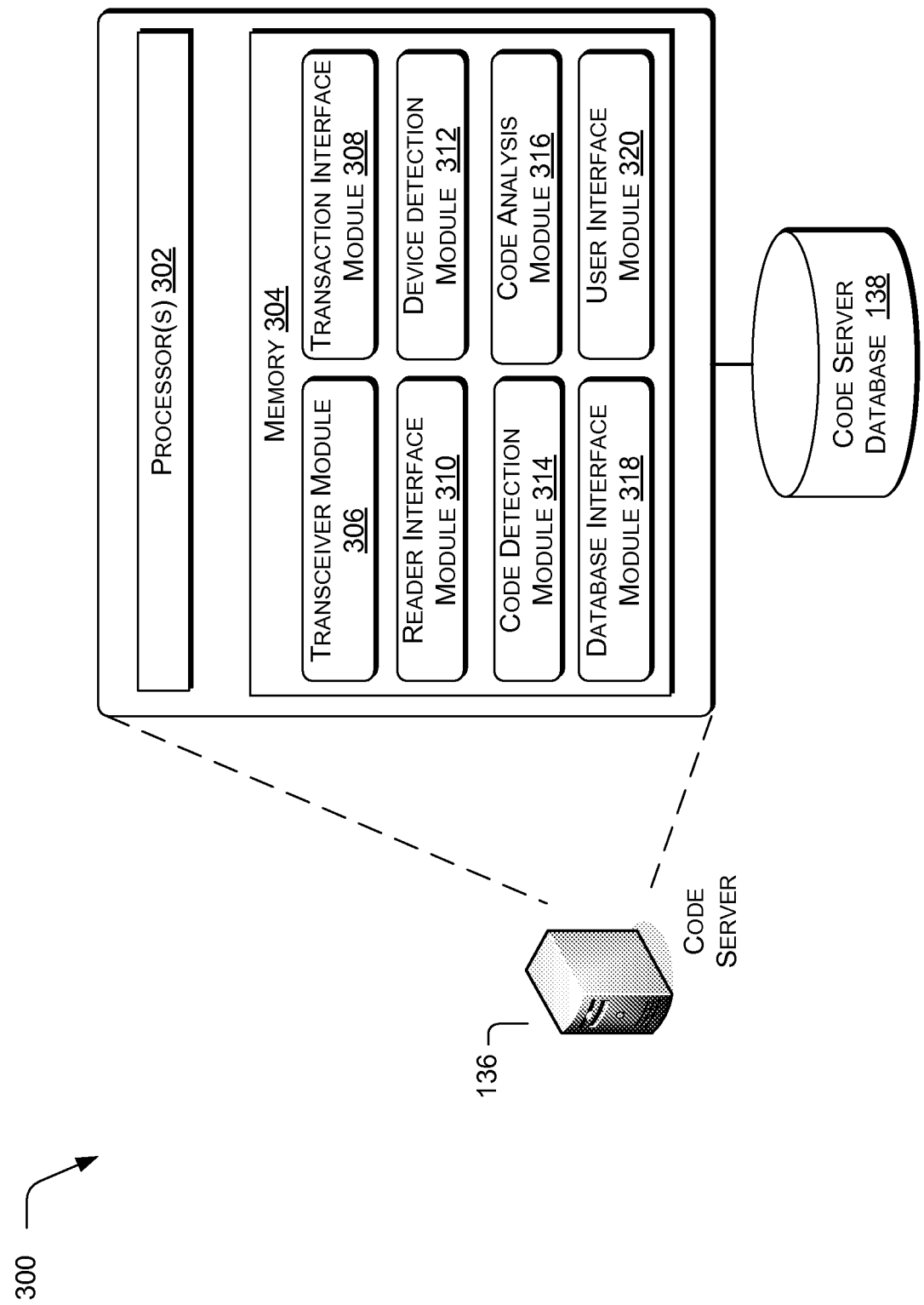
FIG. 3 is a block diagram illustrating selected components of a code server 136 shown in FIG. 1.

FIG. 3 is a block diagram 300 illustrating exemplary components of the code server 136 shown in FIG. 1. The code server 136 has processing capabilities and memory suitable to store and execute computer-executable instructions. In this example, the code server 136 includes one or more processors 302 and memory 304. The memory 304 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in the memory 304 of the code server 136 may be a transceiver module 306, a transaction interface module 308, a reader interface module 310, a device detection module 312, a code detection module 314, a code analysis module 316, a database interface module 318, and a user interface module 320. As described above, the code server 136 may also be connected to the code server database 138.

The transaction interface module 308 may be employed to determine when one or more purchase transactions are completed. The transaction interface module 308 may determine this via the transceiver module 306, and an appropriate communication interface (not shown) to one of the point of sale server 132 and cash register 130. In some embodiments, the transaction interface module 308 may report the completion transactions to the device detection module 312.

In other embodiments, the reader 134 may be configured to detect signals transmitted by wireless communication devices, such as wireless communication device 102, which are in standby mode. In such embodiments, the device detection module 312 may activate the reader 134 via the reader interface module 310 to detect wireless communication devices, such as communication device 102, which are in the proximity of the reader 134. For example, the device detection module 312 may activate the reader 134 after receiving notification from the transaction interface module 308 that one or more purchase transactions are complete. Subsequently, upon detecting one or more wireless communication devices, the reader 134 may report the detection to the device detection module 312.

The code detection module 314 may be configured to detect impression codes that are present in one or more wireless communication devices 102. In particular embodiments, the code detection module 314 may be configured to detect data records, as described above, which contain the impression codes. The code detection module 314 may use the communication capability of the reader 134 to interact with the code management module 218 of the exemplary wireless communication device 102. In this way, the presence of one or more impression codes in the code database 220 of exemplary wireless communication device 102 may be detected. In some embodiments, the code detection module 314 may further employ the transceiver module 306 and the transaction interface module 308 to acquire a list of purchased commodities from one of the cash register 130 and point of sale server 132.

In this way, the code detection module 314 may determine which, if any, of a plurality of the impression codes present in a wireless communication device 102 correspond to the purchased commodities by comparing the commodities corresponding to the impression codes detected from the wireless communication device 102 with the purchased commodities, according to exemplary embodiments. Subsequently, the code server 136 may then activate the code analysis module 316 to acquire the correlated impression codes via reader 134. In some embodiments, the code detection module 314 may be activated after the device detection module 312 provides notification that the wireless communication device 102 is present.

Where the impression codes are included in data records created by the code management module 218 of the wireless communication device 102, the code analysis module 316 may parse out the impression code as well as other information provided by each data record. As described above, the information may include customer identification, the identity of the products relevant to a particular impression code, originating device of the data record, current date and time of creation, and the like. The code analysis module 316 may then create a transaction record for each parsed data record and store the record in the code server database 138 via database interface module 318.

Similarly, in embodiments where the identity of an advertising impression is coded into a corresponding impression code, the code analysis module 316 may parse out the identity of an advertising impression that relates to a particular impression code. The code analysis module 316 may then create transaction records based on the data, and store the transaction records in the code server database 138 via database interface module 318.

In further embodiments, where individual impression codes are originally provided in response to personal information provided by users, the code server database 138 may be pre-loaded with this personal information. Accordingly, the code analysis module 316 may access the code server database 138 via the database interface module 318 to obtain the supplied personal information, and match one or more of the impression codes to the personal information. The code analysis module 316 may then create transaction records based on the matched data and store the records in the code server database 138 via database interface module 318.

Figure 4:
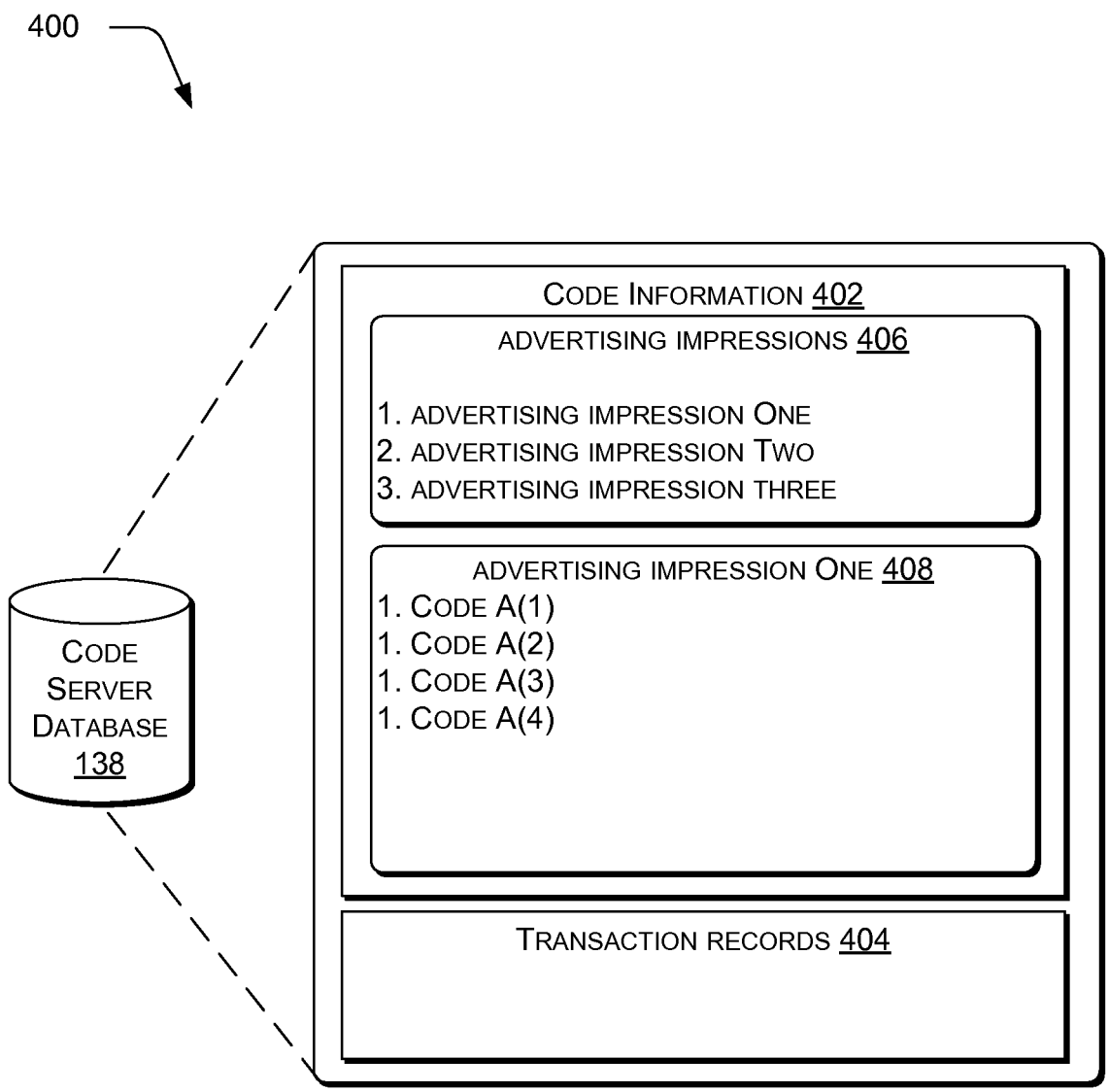
FIG. 4 is a block diagram illustrating the contents of an exemplary code server database 138 shown in FIG. 1.

The code analysis module 316 may also be employed to match an impression code with an advertising impression. The code analysis module 316 may employ a database, such as the code server database 138 illustrated in FIG. 4. As shown, FIG. 4 is a block diagram 400 illustrating the contents of an exemplary code server database 138 shown in FIG. 1. The exemplary code server database 138 may contain a code information section 402 and a transaction records sections 404. The code information section 402 may contain a list of advertising impressions 406. Further, for each advertising impression, one or more of the impression codes related to the particular advertising impression are listed. An exemplary listing 408 is illustrated in FIG. 4. Accordingly, the code analysis module 316 may search through each listing in code information section 402 until an advertising impression that corresponds to the impression code is found. In alternative embodiments, the information in the code information section 402 may be organized by impression codes rather than by advertising impressions. However, it will be appreciated that in still other embodiments, code information section 402 may be organized using other hierarchical database structure, so long as each impression code corresponds with an advertising impression. Once the correspondence between an acquired impression code and a database entry for the impression code has been determined, the code analysis module 316 may then create a transaction record based on the matched data and store the record in the transaction records section 404 of the code server database 138.

In additional embodiments, the code analysis module 316 may also enter any relevant transaction information into the transaction record. For example, in some embodiments, the code analysis module 316 may enter the completion date and time of the transaction into the transaction record. However, it will be appreciated that other embodiments, information such as purchase price, quantity of commodities purchased, location of the purchase, commodity description (e.g., size, manufacturer, date of manufacture, provider, condition, special qualities, etc.), as well as other information that pertain to the transaction, may be entered into the transaction record. The transaction record may then be stored in the code server database 138.

Finally, the user interface module 320 may enable a database administrator to manage, update, and perform maintenance on the code server database 138 via a user interface (not shown).

The exemplary processes in FIGS. 5-8 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the environment 100 of FIG. 1, although it may be implemented in other system architectures.

Figure 5:
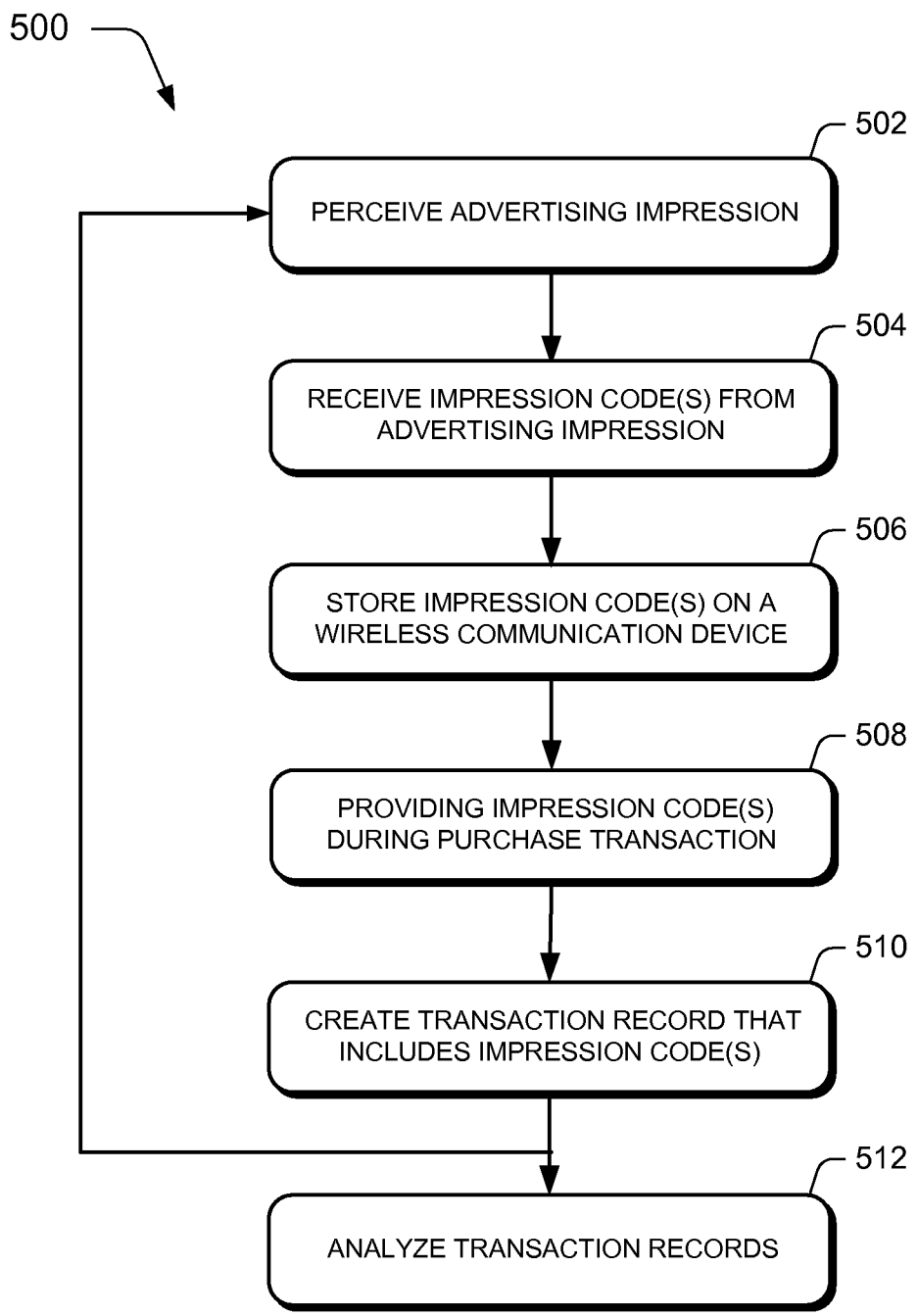
FIG. 5 is a flow diagram illustrating an exemplary process used to track a purchase cycle using impression codes.

FIG. 5 is a flow diagram illustrating an exemplary process 500 used to track a purchase cycle using impression codes. At block 502, the user 104 may perceive an advertising impression for one of a variety of impression sources 106-116. For example, as described above, the advertising impression may be one of an audio visual impression 118, a web-based impression 120, a print impression 122, an audio impression 124, an in-person impression 126, and an electronic message impression 128. At block 504, the user may receive one or more impression codes from the advertising impression. For example, in some embodiments, the user 104 may receive the impression codes through visual or auditory senses and enter the impression codes into the wireless communication device 102 via a user interface 224 or data input (e.g., a camera on the wireless communication device 102). In other embodiments, the wireless communication device 102 may directly receive the impression codes via a communication connection, such as via the Internet or through electronic messages sent via a communication network. The impression codes may provide financial incentive, such as discounts and price reductions to the user 104, if the impression codes are eventually made available to marketers and advertisers. At block 506, the wireless communication device 102 may store the one or more impression codes into a code database 220 in memory 210. As described above, in some embodiments, the wireless communication device 102 may store additional information (e.g., customer identification, product identification, etc.) related to each impression code along with the impression code.

At block 508, the one or more impression codes, including related information, may be provided from the wireless communication device 102 to the code server 136 during a purchase transaction. According to the various embodiments, the one or more impression codes may be transmitted from the wireless communication device 102 to the code server 136 using wireless technologies. At block 510, transaction records based on the impression codes are created and stored by the code server 136 into the code server database 138. In particular embodiments, the transaction records may include information related to the purchase transaction (i.e., time and place of purchase, price, numbers purchased, etc.). Subsequently, process 500 may return to block 502 where the steps in blocks 502-510 are repeated for each of additional advertising impression perceived. At block 512, marketers and advertisers that have access to the data stored in the code server database 138 may use software applications to evaluate the transaction records. For example, in some embodiments, evaluation of the records may provide information such as time from impression to purchase, location of purchase, frequency of purchase, and the like. Statistics and information regarding consumers may also be ascertained. In this way, marketers and advertisers may maximize the value of the advertising revenue by modifying or developing advertising techniques based on their analysis.

Figure 6:
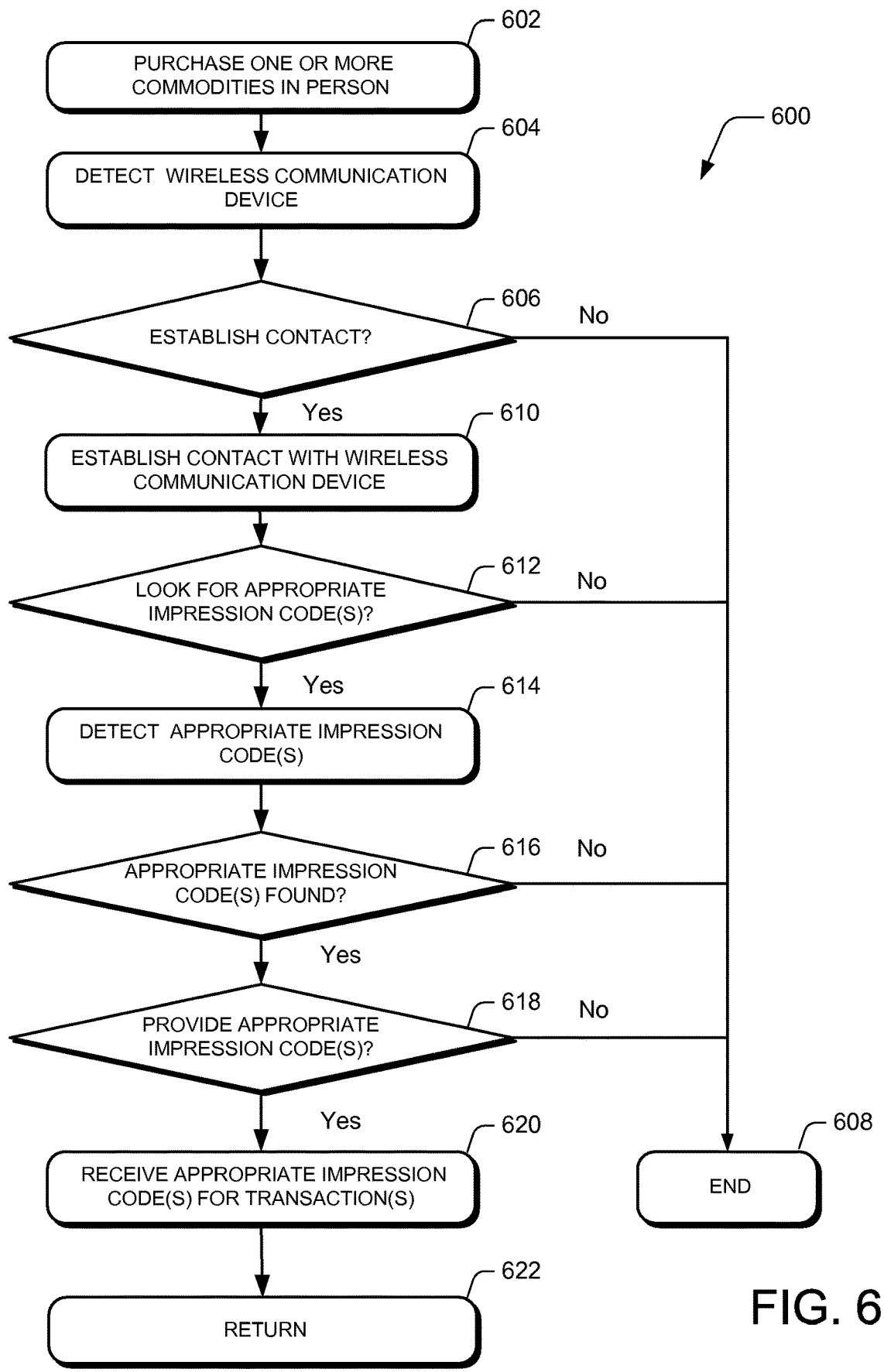
FIG. 6 is a flow diagram illustrating a exemplary process for transmitting one or more impression codes during an in-person purchase transaction.

FIG. 6 is a flow diagram illustrating an exemplary process 600 for transmitting one or more impression codes during an in-person purchase transaction. Process 600 further illustrates block 508 of exemplary process 500, as shown in FIG. 5. At block 602, the user 104 may purchase one or more commodities. At block 604, the code server 136, having been notified by the casher register 130 or the point of sale server 132 that commodities have been purchased, may activate the reader 134 to detect one or more wireless communication devices, such as the wireless communication device 102. Once the wireless communication device 102 is detected, the code server 136 may attempt to establish contact. At decision block 606, the user 104 may be notified of the contact attempt by the code server 136, and the user 104 may command the wireless communication device 102 to either agree or decline to establish contact with the code server 136. In some embodiments, the prompt to the user 104 to establish contact may be passed from the code server 136 to the wireless communication device 102 over a link established by the code management module 218 of the wireless communication device and the code detection module 314 of the code server, respectively, via reader interface module 310 of the code server. The user 104 may also interact with the prompt via the display 222, the user interface 224, and the respective display interface module 212 and user interface module 214.

If the user 104 commands the wireless communication device 102 to decline contact, process 600 ends at block 608, which also results in the termination of process 500 illustrated in FIG. 5. However, if the user 104 commands the wireless communication device 102 to establish connection with the code server 136, then, in accordance with some embodiments, a communication link may be established by the code management module 218 of the wireless communication device 102 and the code detection module 314 of the code server 136 via reader interface module 310 at block 610. This connection may allow the code server 136 to search for impression codes on the wireless communication device 102.

At decision block 612, the user 104 may be prompted to allow the code server 136, specifically, the code detection module 314, to search for one or more appropriate (or related to the commodities purchased) impression codes on the wireless communication device 102 over the established connection. If the user 104 commands the wireless communication device 102 to decline the search, process 600 ends at block 608, which also results in the termination of process 500 illustrated in FIG. 5. However, if the user 104 commands the wireless communication device 102 to accept the search, then the code server 136 may attempt to detect one or more appropriate impression codes at block 614.

At decision block 616, the code server 136, specifically, the code detection module 314, may determine whether appropriate impression codes are found. If no appropriate impression codes are found, process 600 ends at block 608, which also results in the termination of process 500 illustrated in FIG. 5. However, if appropriate impression codes are found, the user 104, at decision block 618, may be prompted to provide the one or more impression codes from the wireless communication device 102 so that the impression codes may be received by the code server 136. If the user 104 declines to provide the one or more appropriate impression codes at decision block 614, process 600 ends at block 608, which also results in the termination of process 500 illustrated in FIG. 5. However, if the user 104 commands the wireless communication device 102 to provide the the one or more appropriate impression codes, the impression codes are then received by the code server 136 at block 620. At block 622, the process 600 returns to process 500.

While the exemplary process 600, as illustrated above, includes decision blocks 606, 616, and 618, where the user 104 may be prompted to make decisions, it will be appreciated that the user 104 may configure the wireless communication device 102 to automatically provide affirmative responses at one or more of these decisions blocks. In this way, the communication device 102 may be configured to expedite the transmission of one or more impression codes, or alternatively, automatically transmit the one or more impression codes during a purchase transaction.

Figure 7:
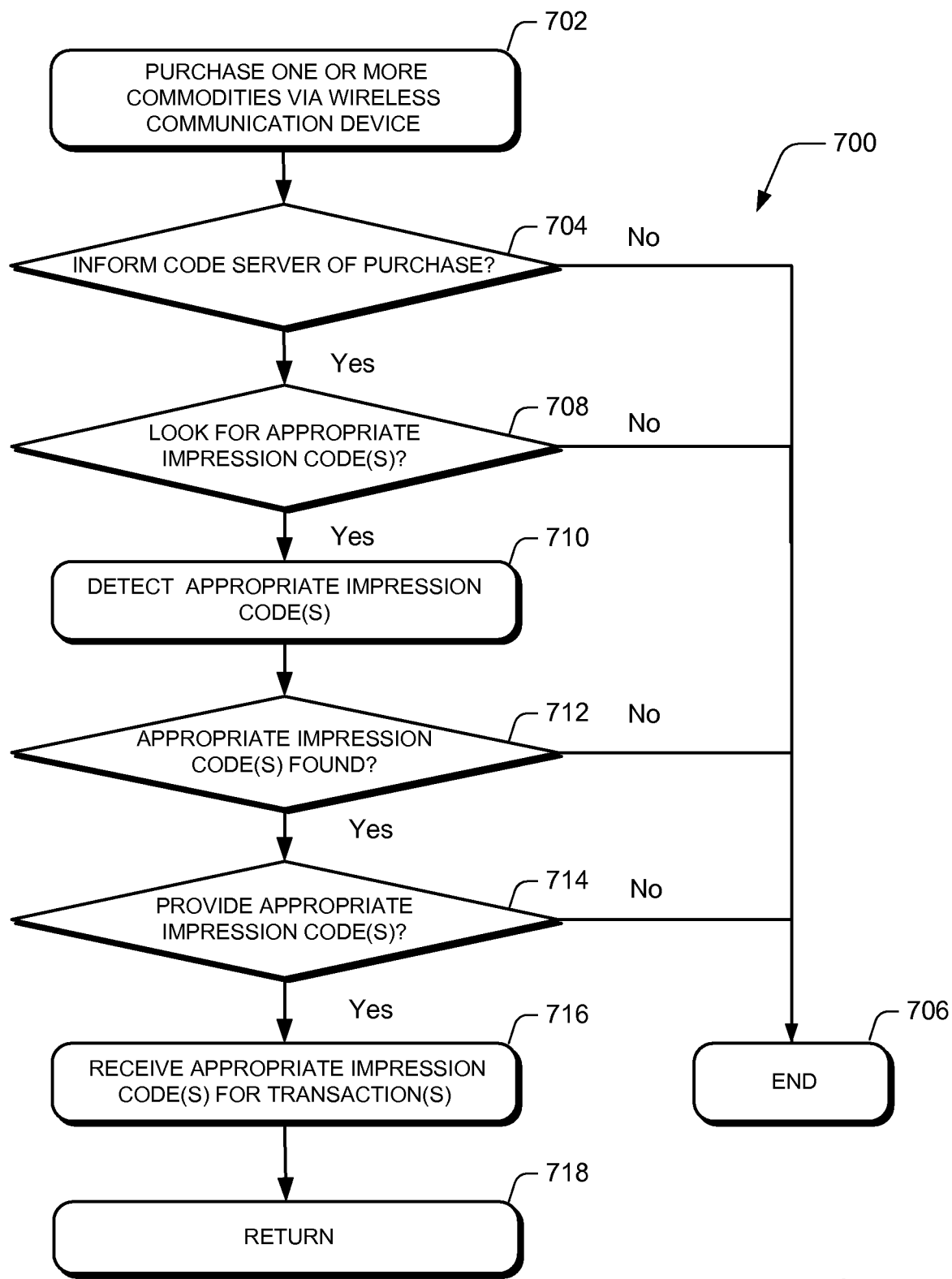
FIG. 7 is a flow diagram illustrating an exemplary process for transmitting one or more impression codes during a purchase transaction conducted on a wireless communication device 102.

FIG. 7 is a flow diagram illustrating an exemplary process 700 for transmitting one or more impression codes during a purchase transaction conducted on a wireless communication device 102. Process 700 further illustrates block 508 of exemplary process 500, as shown in FIG. 5. At block 702, the user 104 may purchase one or more commodities using the wireless communication device 102. In one embodiment, the user 104 may purchase the one or more commodities by completing a web-based transaction using the micro-browser included in the display interface module 212.

At decision block 704, the user 104 may use the micro-browser, which is included in the display interface module 202, to trigger the code management module 218 to inform the code server 136 of the purchases. Alternatively, the code management module 218 may prompt the user 104 to inform the code server 136 of the purchase when it determines that the user 104 may be in the process of a purchase transaction. If the user 104 determines that the code server 136 should not be informed of the purchase, process 700 ends at block 706, which also results in the termination of process 500 illustrated in FIG. 5. However, if the user 104 determines that the code server 136 should be informed of the purchase, the process may continue to decision block 708.

At decision block 708, the code server 136 may prompt the user 104 to allow the code detection module 314 to search for one or more appropriate (or related to the commodities purchased) impression codes on the wireless communication device 102.

If the user 104 commands the wireless communication device 102 to decline the search, process 700 ends at block 706, which also results in the termination of process 500 illustrated in FIG. 5. However, if the user 104 commands the wireless communication device 102 to accept the search, then the code server 136 may attempt to detect one or more appropriate impression codes at block 710.

At decision block 712, the code server 136, specifically, the code detection module 314, may determine whether appropriate impression codes are found. If no appropriate impression codes are found, process 700 ends at block 706, which also results in the termination of process 500 illustrated in FIG. 5. However, if appropriate impression codes are found, the user 104, at decision block 714, may be prompted to provide the one or more impression codes from the wireless communication device 102 so that the impression codes may be received by the code server 136.

If the user declines to provide the one or more appropriate impression codes at decision block 714, process 700 ends at block 706, which also results in the termination of process 500 illustrated in FIG. 5. However, if the user commands the wireless communication device 102 to provide the one or more appropriate impression codes, the impression codes are then received by the code server 136 at block 716. At block 718, the process 700 returns to process 500.

It will be appreciated that the user 104 may configure the wireless communication device 102 to automatically provide an affirmative response at decision blocks 708 and 714. In this way, the communication device 102 may be configured to expedite the transmission of one or more impression codes, or alternatively, automatically transmit the one or more impression codes during a purchase transaction.

Figure 8:
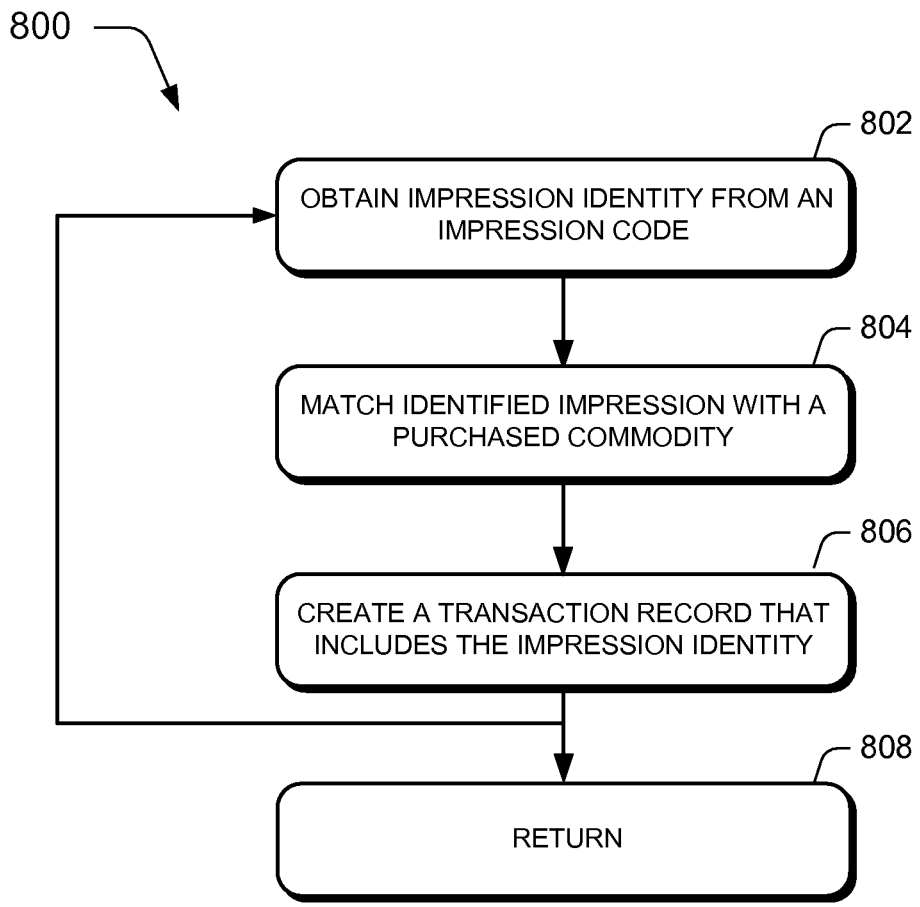
FIG. 8 is a flow diagram illustrating an exemplary process for creating transaction records from one or more impression codes during a purchase transaction.

FIG. 8 is a flow diagram illustrating an exemplary process 800 for creating transaction records from one or more impression codes during a purchase transaction. Process 800 further illustrates block 510 of exemplary process 500, as shown in FIG. 5. At block 802, the code analysis module 316 may be used to obtain the identity of the advertising impression from an impression code. As described above, in various embodiments, obtaining the identity of the advertising impression may be accomplished by parsing the identity from the impression code or the data record of the impression code that includes the identity of the advertising impression. In other embodiments, the identity may be obtained by matching the impression code to the corresponding advertising impression using code information section 402 in code server database 138.

At block 804, as described above, the code analysis module 316 may associate the identified advertising impression with a purchased commodity in certain embodiments by accessing information from one or more of the cash register 130, the point of sale server 132, or comparable payment processing equipment. At block 806, the code analysis module 316 may create a transaction record of the information from the various sources (e.g., customer identification, the identity of the products, originating device of the data record, purchase price, number of commodities purchased, location of purchase, etc.), wherein the transaction record includes the advertising impression identity. Subsequently, process 800 may return to block 802 where the steps in blocks 802-806 are repeated for each of the commodities purchased. At block 808, the process 800 returns to process 500.

While several embodiments of the disclosed invention have been described, it should be apparent, however, that various modifications, alterations and adaptations to those embodiments may occur to persons ordinarily skilled in the art with attainment of some or all of the advantages of the disclosed invention.

The invention claimed is:

1. A method comprising:
   receiving, by a server, a short messaging service (SMS) message sent via a wireless network, the SMS message associated with a wireless device, the SMS message providing a notification of an electronic purchase transaction conducted by the wireless device;
   determining, by the server, an impression code specified by the SMS message, the impression code associated with an electronic advertisement sent to the wireless device; and
   adding, by the server, an entry to an electronic database, the electronic database storing transactional records of purchases conducted by the wireless device, the entry electronically associating the impression code to the electronic purchase transaction conducted by the wireless device.

2. The method of claim 1, further comprising determining a web page sent to the wireless device, the web page linking to the electronic advertisement sent to the wireless device.

3. The method of claim 1, further comprising searching the wireless device for the impression code.

4. The method of claim 1, further comprising establishing communication with the wireless device.

5. The method of claim 1, further comprising prompting the wireless device to send the impression code.

6. The method of claim 1, further comprising associating the impression code to personal information, the personal information associated with a user of the wireless device.

7. The method of claim 1, further comprising associating the impression code to product information, the product information associated with a product purchased by a user of the wireless device.

8. A wireless device using a short messaging service (SMS) to notify a server, the wireless device comprising:
   a hardware processor; and
   a memory device, the memory device storing instructions, the instructions when executed causing the hardware processor to perform operations, the operations comprising:
      receiving a selection associated with an electronic advertisement;
      determining an impression code associated with the electronic advertisement;
      generating an SMS message in response to the selection associated with the electronic advertisement, the SMS message comprising the impression code; and
      sending the SMS message via a wireless network to the server, the SMS message providing the impression code as a notification of the selection associated with the electronic advertisement.

9. The wireless device of claim 8, wherein the operations further comprise receiving the electronic advertisement via the wireless network.

10. The wireless device of claim 8, wherein the operations further comprise storing the impression code in an electronic database, the electronic database electronically associating the impression code to the electronic advertisement.

11. The wireless device of claim 8, wherein the operations further comprise storing an electronic database that electronically associates impression codes to electronic advertisements.

12. The wireless device of claim 11, wherein the operations further comprise searching the electronic database to identify the impression code of the impression codes that is electronically associated with the electronic advertisement of the electronic advertisements.

13. The wireless device of claim 8, wherein the operations further comprise determining an address associated with the server.

14. The wireless device of claim 8, wherein the operations further comprise determining a web page sent to the wireless device, the web page linking to the electronic advertisement.

15. A non-transitory memory device storing instructions that when executed cause a hardware processor of a wireless device to perform operations, the operations comprising:
   wirelessly receiving an electronic advertisement sent via a wireless network;
   conducting an electronic purchase transaction in response to a selection of the electronic advertisement;
   identifying an impression code associated with the electronic advertisement;
   generating an SMS message in response to the electronic purchase transaction, the SMS message specifying the impression code; and
   sending the SMS message via the wireless network to a server, the SMS message providing a notification of the impression code associated with the electronic advertisement.

16. The non-transitory memory device of claim 15, wherein the operations further comprise storing the impression code in an electronic database, the electronic database electronically associating the impression code to the electronic advertisement.

17. The non-transitory memory device of claim 15, wherein the operations further comprise storing an electronic database that electronically associates impression codes to electronic advertisements.

18. The non-transitory memory device of claim 17, wherein the operations further comprise searching the electronic database to identify the impression code of the impression codes that is electronically associated with the electronic advertisement of the electronic advertisements.

19. The non-transitory memory device of claim 15, wherein the operations further comprise determining an address associated with the server.

20. The non-transitory memory device of claim 15, wherein the operations further comprise determining a web page sent to the wireless device, the web page linking to the electronic advertisement.

* * * * *